(12) United States Patent
Pullen

(10) Patent No.: US 6,170,502 B1
(45) Date of Patent: Jan. 9, 2001

(54) COLLAPSIBLE PORTABLE CAMPER SYSTEM

(76) Inventor: Jerome A. Pullen, 2501--22nd St., SE., Minot, ND (US) 58701

( * ) Notice: Under 35 U.S.C. 154(b), the term of this patent shall be extended for 0 days.

(21) Appl. No.: 09/267,050

(22) Filed: Mar. 12, 1999

(51) Int. Cl.$^7$ ................. E04H 15/06; B60P 3/32
(52) U.S. Cl. .................. 135/88.13; 135/88.15; 135/88.16; 296/156; 296/161; 296/169; 296/174; 52/66
(58) Field of Search ............... 135/88.13, 88.14, 135/88.15, 88.16, 130, 150, 151, 88.01; 296/156, 160–163, 164, 169, 174, 176, 26.04, 26.05, 26.09, 26.12, 26.15; 52/66, 69

(56) References Cited

U.S. PATENT DOCUMENTS

| | | | |
|---|---|---|---|
| 1,595,541 | * 8/1926 | Borth | 296/174 X |
| 2,957,482 | * 10/1960 | Tomek | 135/88.13 |
| 2,969,074 | * 1/1961 | Willis | 135/150 X |
| 3,000,664 | * 9/1961 | Martin | 296/172 X |
| 3,371,954 | * 3/1968 | Larsson | 135/132 X |
| 3,674,305 | * 7/1972 | Steury | 296/26.05 X |
| 3,737,190 | * 6/1973 | Smith et al. | 135/88.13 X |
| 4,294,484 | * 10/1981 | Robertson | 135/88.13 X |
| 4,830,242 | * 5/1989 | Painter | 296/26.09 |
| 5,462,330 | * 10/1995 | Brown | 135/88.13 X |
| 5,478,129 | * 12/1995 | Goto et al. | 135/88.13 X |

* cited by examiner

Primary Examiner—Carl D. Friedman
Assistant Examiner—Winnie Yip
(74) Attorney, Agent, or Firm—Michael S. Neustel

(57) ABSTRACT

A collapsible portable camper system for folding into a compact position during nonuse and for expanding into a spacious camper while positioned upon a pickup. The inventive device includes a first wall, a second wall attached to a floor, a pair of side walls, a first platform and a second platform pivotally attached to the side walls, a roof, a tarp attached to the roof, and an elevating structure that extends and retracts the roof. A plurality of support shafts are attached to the roof that are slidably attached to the first wall and the second wall, and that are mechanically coupled to the elevating structure. A plurality of rollers are preferably rotatably attached to the lower surface of the floor for allowing easy removal and insertion upon a conventional pickup. At least one netting is positioned within the tarp serving as a window for the invention. A crank handle is removably attachable to a crank sprocket that is positioned about a crank shaft that extends between the first wall and the second wall. The user simply manipulates the crank handle to elevate the roof thereby allowing the first platform and the second platform to be extended and which are thereafter supported by a plurality of support cables. A pair of wall frames are removably inserted into receiving tubes upon the platforms and the tarp is thereafter attached to hooks on the lower surface of the platforms forming a spacious interior compartment.

20 Claims, 5 Drawing Sheets

COLLAPSIBLE PORTABLE CAMPER SYSTEM

BACKGROUND OF THE INVENTION

1. Field of the Invention

The present invention relates generally to camper devices and more specifically it relates to a collapsible portable camper system for folding into a compact position during nonuse and for expanding into a spacious camper while positioned upon a pickup.

2. Description of the Prior Art

Camper devices have been in use for years. Typically, a conventional camper has a floor, front and rear walls, side walls and a roof forming a rigid and rectangular structure. For conventional campers designed to fit upon a conventional pickup, the main problem is that the overall width is limited because of road restrictions and safety concerns.

Therefore, the interior portion of a conventional camper designed for a conventional pickup is typically not comfortable for extended stays. In addition, many conventional campers have a width that is much wider that the pickup making it difficult to navigate around objects. Also, the overhang is dangerous to individuals walking around the conventional camper when not in use because they may engage the overhang with their bodies.

While these devices may be suitable for the particular purpose to which they address, they are not as suitable for folding into a compact position during nonuse and for expanding into a spacious camper while positioned upon a pickup. Conventional campers are difficult to navigate a pickup with because they block view with the side mirrors. Also, conventional campers are prone to engaging objects near the vehicle making them a hazard.

In these respects, the collapsible portable camper system according to the present invention substantially departs from the conventional concepts and designs of the prior art, and in so doing provides an apparatus primarily developed for the purpose of folding into a compact position during nonuse and for expanding into a spacious camper while positioned upon a pickup.

SUMMARY OF THE INVENTION

In view of the foregoing disadvantages inherent in the known types of camper devices now present in the prior art, the present invention provides a new collapsible portable camper system construction wherein the same can be utilized for folding into a compact position during nonuse and for expanding into a spacious camper while positioned upon a pickup.

The general purpose of the present invention, which will be described subsequently in greater detail, is to provide a new collapsible portable camper system that has many of the advantages of the camper devices mentioned heretofore and many novel features that result in a new collapsible portable camper system which is not anticipated, rendered obvious, suggested, or even implied by any of the prior art camper devices, either alone or in any combination thereof.

To attain this, the present invention generally comprises a first wall, a second wall attached to a floor, a pair of side walls, a first platform and a second platform pivotally attached to the side walls, a roof, a tarp attached to the roof, and an elevating structure that extends and retracts the roof. A plurality of support shafts are attached to the roof that are slidably attached to the first wall and the second wall, and that are mechanically coupled to the elevating structure. A plurality of rollers are preferably rotatably attached to the lower surface of the floor for allowing easy removal and insertion upon a conventional pickup. At least one netting is positioned within the tarp serving as a window for the invention. A crank handle is removably attachable to a crank sprocket that is positioned about a crank shaft that extends between the first wall and the second wall. The user simply manipulates the crank handle to elevate the roof thereby allowing the first platform and the second platform to be extended and which are thereafter supported by a plurality of support cables. A pair of wall frames are removably inserted into receiving tubes upon the platforms and the tarp is thereafter attached to hooks on the lower surface of the platforms forming a spacious interior compartment.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a collapsible portable camper system that will overcome the shortcomings of the prior art devices.

Another object is to provide a collapsible portable camper system that folds into a compact storage position.

An additional object is to provide a collapsible portable camper system that expands forming a spacious interior for individuals to utilize.

A further object is to provide a collapsible portable camper system that is removably positionable upon a conventional pickup.

Another object is to provide a collapsible portable camper system that does not interfere with the normal operation of the pickup while attached to the pickup.

An additional object is to provide a collapsible portable camper system that is easily extended and retracted by a single user.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
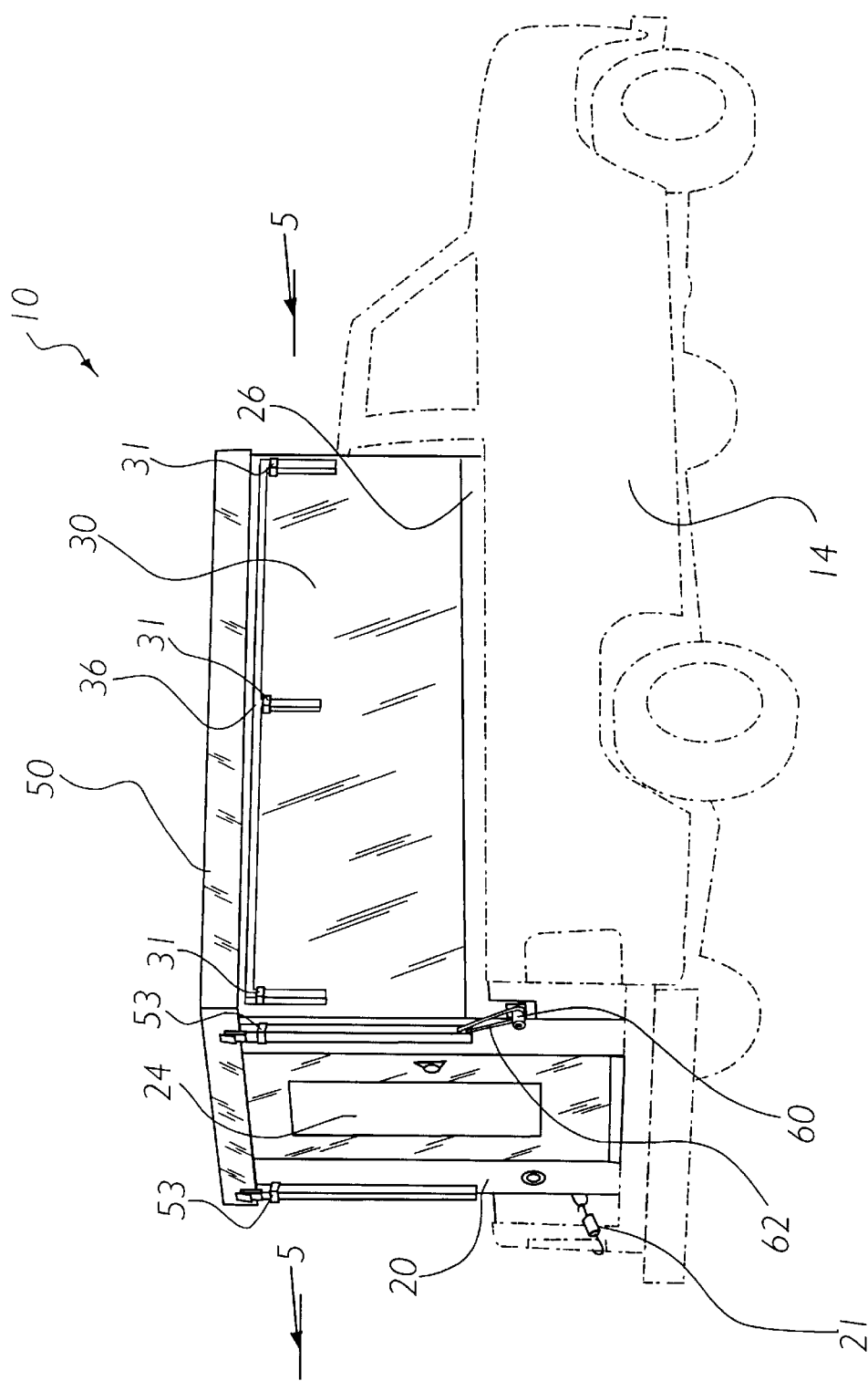
FIG. 1 is a perspective view of the present invention attached upon a pickup in the closed position.

Turning now descriptively to the drawings, in which similar reference characters denote similar elements throughout the several view, FIGS. 1 through 5 illustrate a collapsible portable camper system 10, which comprises a first wall 20, a second wall 22 attached to a floor 28, a pair of side walls 26, a first platform 30 and a second platform 32 pivotally attached to the side walls 26, a roof 50, a tarp 40 attached to the roof 50, and an elevating structure that extends and retracts the roof 50. A plurality of support shafts 51 are attached to the roof 50 that are slidably attached to the first wall 20 and the second wall 22, and that are mechanically coupled to the elevating structure. A plurality of rollers 33 are preferably rotatably attached to the lower surface of the floor 28 for allowing easy removal and insertion upon a conventional pickup 14.

At least one netting 42 is positioned within the tarp 40 serving as a window for the invention. A crank handle 64 is removably attachable to a crank sprocket 60 that is positioned about a crank shaft 66 that extends between the first wall 20 and the second wall 22. The user simply manipulates the crank handle 64 to elevate the roof 50 thereby allowing the first platform 30 and the second platform 32 to be extended and which are thereafter supported by a plurality of support cables 34. A pair of wall frames 36 are removably inserted into receiving tubes 38 upon the platforms and the tarp 40 is thereafter attached to hooks on the lower surface of the platforms forming a spacious interior compartment.

Figure 2:
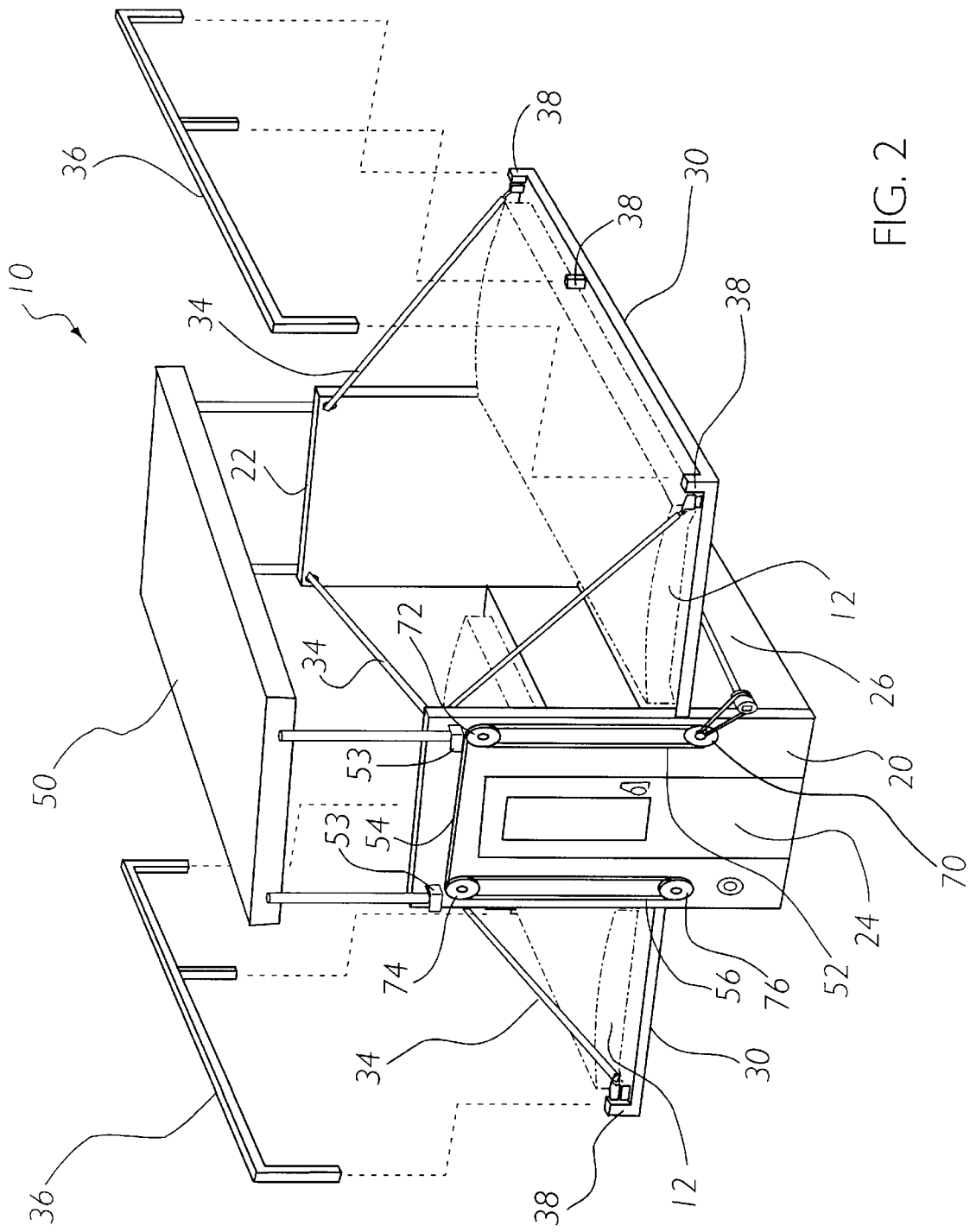
FIG. 2 is an exploded upper perspective view of the present invention without the tarp attached.

As best shown in FIG. 2 of the drawings, the first wall 20 and the second wall 22 are both attached orthogonally to opposite ends of the floor 28. The width of the walls 20, 22 is preferably less than the distance between the wheel wells of the pickup 14. The floor 28 preferably has a length approximately of the bed of the pickup 14 as shown in FIG. 1.

Figure 3:
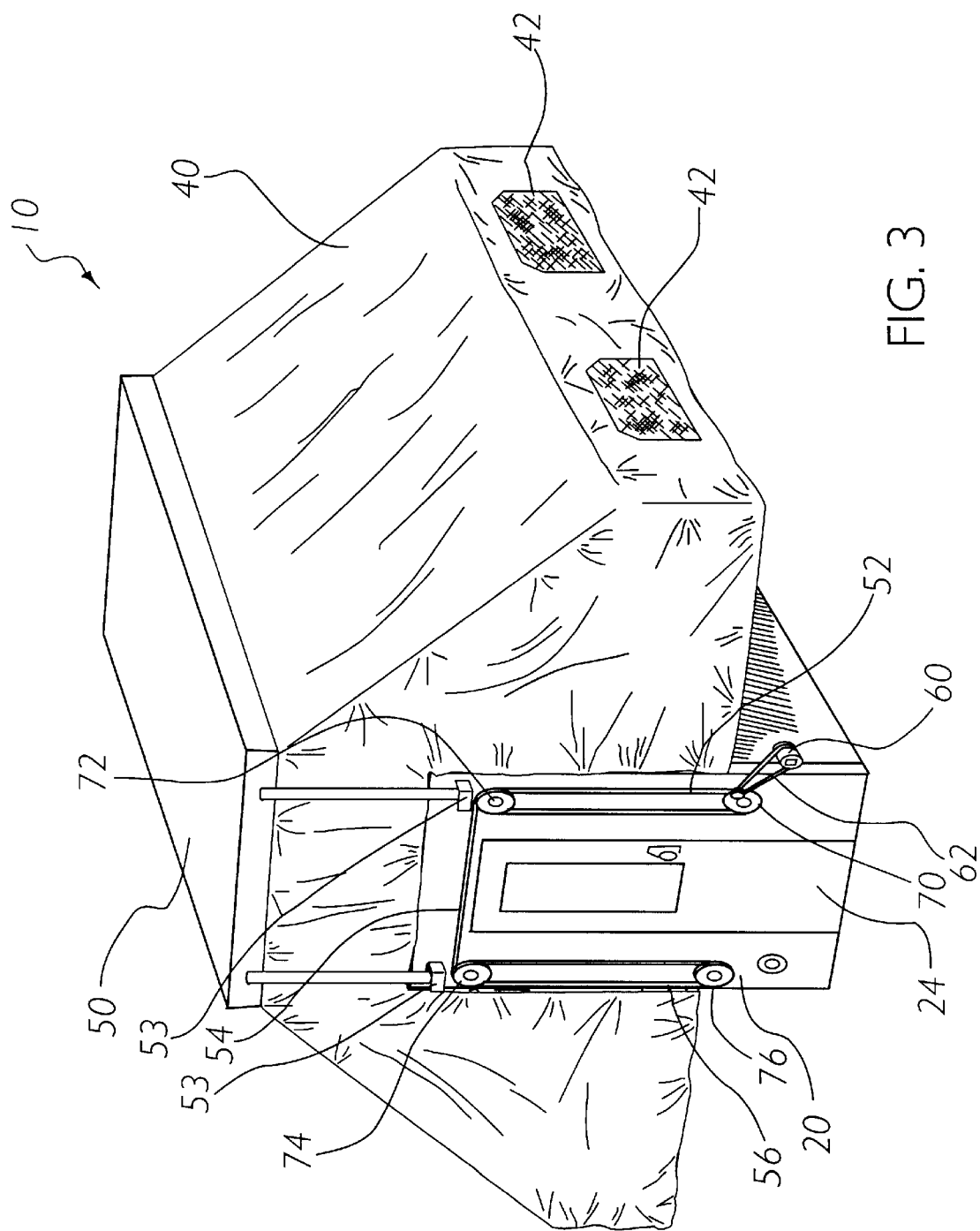
FIG. 3 is an upper perspective view of the present invention in the open position with the platforms fully extended.

As shown in FIGS. 1 through 3, a pair of side walls 26 are attached to the floor 28 and between the first wall 20 and the second wall 22 forming a rectangular shaped cavity. The side walls 26 have a height substantially less than the height of the first wall 20 and second wall 22. As shown in FIGS. 1 through 4, a door 24 is positioned within an opening within the first wall 20.

Figure 5:
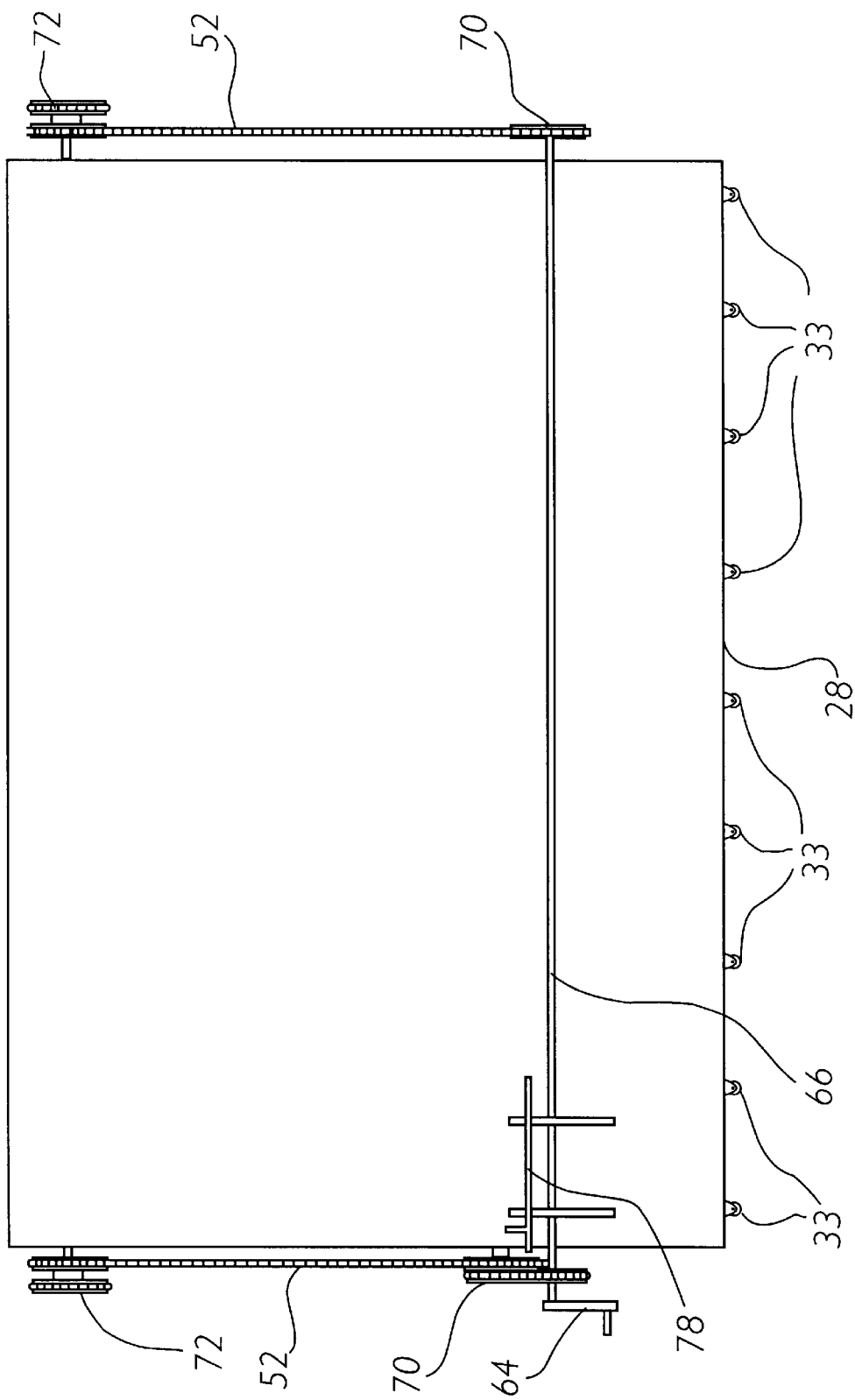
FIG. 5 is a cross sectional view taken along line 5—5 of FIG. 1 showing the chain operated elevating system.

As shown in FIG. 5 of the drawings, a plurality of wheels are rotatably attached to the floor 28 thereby slidably supporting the floor 28 upon the bed of the pickup 14 allowing easy insertion and removal from within the box of the pickup 14. When positioned within the box of the pickup 14, conventional tie downs 21 that are threadably adjustable are attached to the outsides of the side walls 26 and connect to pickup 14 for preventing movement of the invention while traveling or while in the stationary position.

As best shown in FIGS. 2 and 3, a first platform 30 and a second platform 32 are pivotally attached to opposing side walls 26. The platforms 30, 32 are supported in the open position shown in FIGS. 2 and 3 by a plurality of support cables 34 attached to the outer portions of the platforms 30, 32 and to the upper portions of the first wall 20 and the second wall 22.

The platforms 30, 32 are securable into a closed position by a plurality of unnumbered conventional locking devices. A mattress 12 is removably positionable upon the first platform 30 and the second platform 32 when in the extended position for allowing an individual to sleep upon.

As best shown in FIG. 2, a pair of wall frames 36 are removably insertable into a plurality of receiving tubes 38 when in the open position for supporting the tarp 40. As shown in FIG. 1 of the drawings, a plurality of storage brackets 31 are attached to the underside of the platforms 30, 32 for storage of the wall frames 36 when in the storage position allowing compact closing of the invention.

As best shown in FIG. 3, a tarp 40 is attached to the roof 50 and to the first wall 20 and the second wall 22. The tarp 40 may be retained by hook and loop fastener between the first wall 20 and the second wall 22 for insuring proper sealing. The tarp 40 is extendible over the pair of wall frames 36 and removably attached to the underside of the platforms by engaging a conventional fastener such as a hook through a strap or apertures within the tarp 40. As shown in FIG. 3, a plurality of openings exist within the tarp 40 that are enclosed with netting 42 for allowing air and sunlight into the interior of the invention.

As best shown in FIGS. 1 through 3, the roof 50 is substantially rectangular shaped. The roof 50 has an overhang portion that surrounds the first wall 20, the second wall 22 and the platforms 30, 32 when in the closed position as shown in FIG. 1 of the drawings. A plurality of support shafts 51 are attached to the ends of the roof 50 and extend downwardly to slidably mate with a corresponding plurality of guide brackets 53 attached to the first wall 20 and the second wall 22.

As shown in FIG. 5, a crank shaft 66 is rotatably supported upon one of the side walls 26. A crank sprocket 60 is attached to the rear and front end of the crank shaft 66. The rear end crank sprocket 60 removably receives a crank handle 64 for allowing a user to manually rotate the crank shaft 66 as shown in FIG. 5. A lock pin 78 is slidably connectable to the crank shaft 66 for preventing movement of the crank shaft 66 to prevent accidental movement of the crank shaft 66.

A crank chain 62 is mechanically connected to each crank sprocket 60 and extends to mechanically mate with a first sprocket 70 rotatably mounted to the first wall 20 and the second wall 22 as shown in FIG. 5. A first chain 52 extends from the crank sprocket 60 and mechanically mates with a second sprocket 72 rotatably attached to the first wall 20 and the second wall 22.

Figure 4:
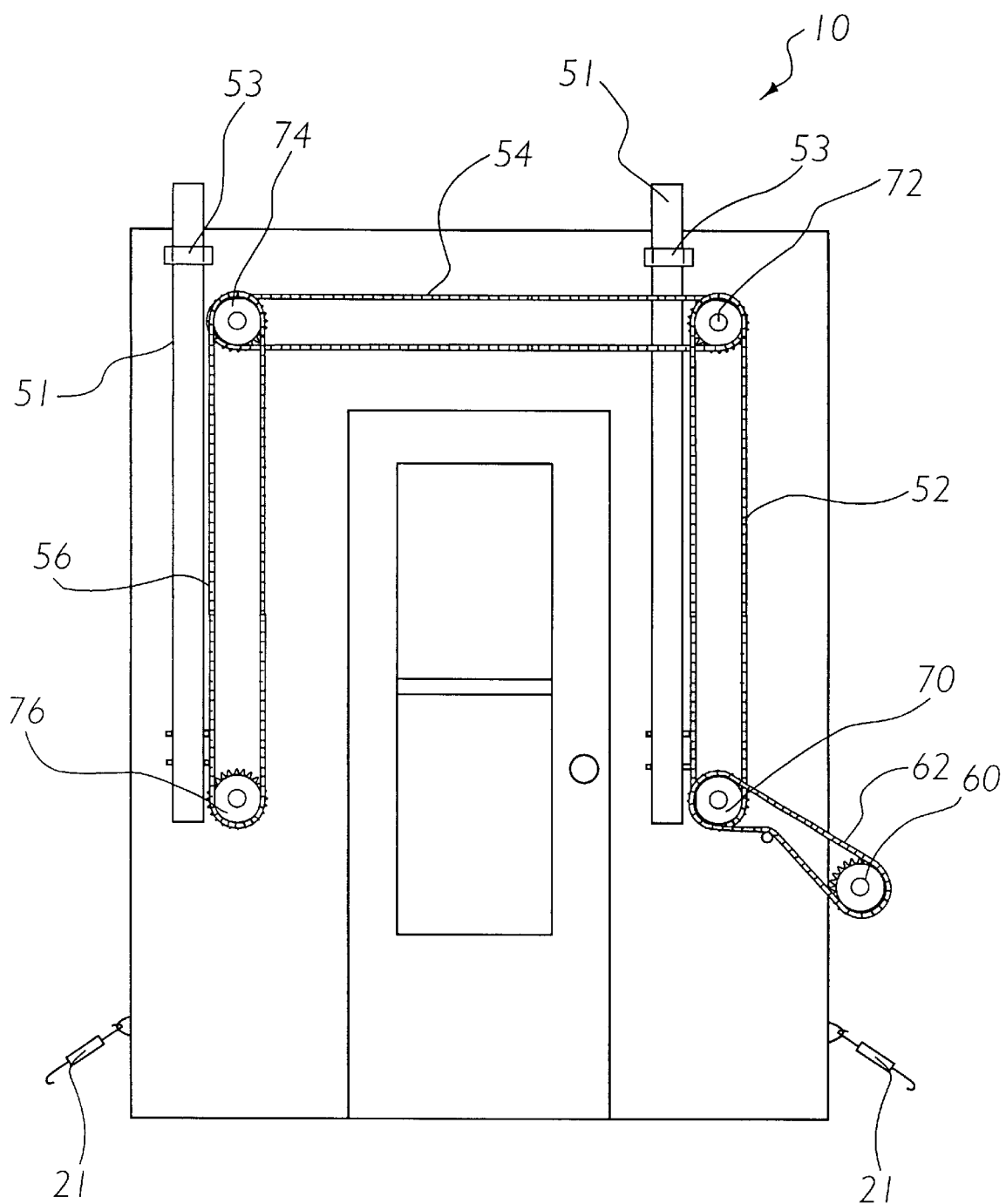
FIG. 4 is a rear view of the present invention.

As shown in FIG. 4, a second chain 54 is mechanically connected between the second sprocket 72 and a third sprocket 74 rotatably attached to the first wall 20 and the second wall 22. A third chain 56 extends from the third sprocket 74 and mates with a fourth sprocket 76 rotatably attached to the first wall 20 and the second wall 22 as further shown in FIG. 4. As shown in FIG. 4 of the drawings, the first chain 52 and the third chain 56 are secured to the lower portion of the support shafts 51 for elevating the roof 50.

In use, the user inserts the crank handle 64 into the rear crank sprocket 60 and releases the lock pin 78. The user rotates the crank handle 64 in a clockwise movement so that the chains rotate in a clockwise movement. The support shafts 51 attached to the first chain 52 and the third chain 56 on opposing sides of the crank shaft 66 are elevated upwardly thereby elevating the roof 50 from the first wall 20, second wall 22 and platforms 30, 32. The user continues to crank until the roof 50 is fully extended and then repositions the lock pin 78 to insure that the crank shaft 66 does not move. The user thereafter unlocks the platforms 30, 32 from the first wall 20 and the second wall 22 thereby allowing the platforms 30, 32 to rest in a substantially horizontal position when the support cables 34 are tensioned as shown in FIG. 2 of the drawings. The user then removes the wall frames 36 from the storage brackets 31 and inserts them vertically into the receiving tubes 38 as shown in FIG. 2 of the drawings. The user then manipulates the lower portion of the tarp 40 over the wall frames 36 and attaches the lower portions of the tarp 40 to the underside of the platforms 30, 32 by a plurality of hooks or other well known fastener as shown in FIG. 3 of the drawings. The user then enters through the door 24 to position a mattress 12 upon each of the platforms 30, 32 and positions any other objects. The user then utilizes the invention as a conventional camper.

When finished using the invention, the user simply releases the lock pin 78 and rotates the crank shaft 66 counterclockwise so that the support shafts 51 are lowered. Prior to the roof 50 becoming completely closed, the user releases the tarp 40 from the platforms 30, 32 and then removes the wall frames 36. The user then inserts the wall frames 36 into the storage brackets 31 after elevating the platforms 30, 32 into a locked vertical position with the first wall 20 and the second wall 22. The user continues to rotate the crank shaft 66 counterclockwise until the roof 50 is in the lowered position upon the first wall 20, second wall 22 and the platforms 30, 32 as shown in FIG. 1 of the drawings. The user may then drive to the next location or home. To remove the invention from the pickup 14, the tie downs 21 are simply loosed and removed from the side walls 26 allowing the invention to freely move within the pickup 14 upon the rollers 33. A pair of vertical support members or other structure, may be utilize to support the invention as the user drives the pickup 14 away from the support members. A pair of jacks may also be utilized to elevate the invention to allowing insertion of the support members.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A collapsible portable camper system, comprising:
    a frame having a floor, a first wall, a second wall and a pair of side walls, wherein said side walls are lesser in height than said first wall and second wall;
    a pair of platforms pivotally attached to said pair of side walls;
    a roof removably enclosing said frame and said pair of platforms when in a closed position;
    a covering attached to said roof for extending over said pair of platforms; and
    a means for elevating and lowering said roof from said closed position to an open position, wherein said means for elevating and lowering said roof comprises a plurality of guide brackets attached to said frame, a plurality of support shafts slidably positioned within said plurality of guide brackets and attached to said roof, and an elevating/lowering means mechanically connected to said plurality of support shafts for elevating and lowering said roof.

2. The collapsible portable camper system of claim 1, wherein said covering is attached to an underside of said pair of platforms by an attachment means.

3. The collapsible portable camper system of claim 1, further including:
    a pair of wall frames; and
    a each of said platforms having plurality of receiving tubes that removably receive one of said pair of wall frames.

4. The collapsible portable camper system of claim 1, including a plurality of rollers rotatably attached to said floor for allowing easy removal and insertion of said frame upon a conventional pickup.

5. The collapsible portable camper system of claim 1, including a plurality of tie downs for removably securing said frame within a pickup.

6. The collapsible portable camper system of claim 1, wherein said covering includes at least one opening covered with netting.

7. The collapsible portable camper system of claim 1, wherein said elevating/lowering means comprises:
    a crank shaft rotatably attached to one of said side walls;
    a pair of crank sprockets attached to opposing ends of said crank shaft;
    a crank handle connectable to one of said pair of crank sprockets;
    a pair of crank chains mechanically connected to said pair of crank sprockets;
    a pair of first sprockets mechanically connected to said pair of crank chains;
    a pair of first chains mechanically connected between said pair of first sprockets and a pair of second sprockets, wherein said pair of first chains are connected to a lower portion of at least two support shafts for elevating and lower said support shafts;
    a pair of third sprockets mechanically connected to said pair of second sprockets by a corresponding pair of second chains; and
    a pair of fourth sprockets mechanically connected to said pair of third sprockets by a corresponding pair of third chains, wherein said pair of third chains are connected to a lower portion of at least two support shafts for elevating and lower said support shafts.

8. The collapsible portable camper system of claim 3, including a plurality of storage brackets attached to said pair of platforms for removably receiving said pair of wall frames when not in use.

9. A collapsible portable camper system, comprising:
    a frame having a floor, a first wall, a second wall, a door within said first wall and a pair of side walls, wherein said side walls are lesser in height than said first wall and second wall;

a pair of platforms pivotally attached to said pair of side walls;

four support cables attached between said frame and said pair of platforms for preventing said pair of platforms from extending past a horizontal position when extended;

a pair of mattresses removably positionable upon said pair of platforms;

a roof removably enclosing said frame and said pair of platforms when in a closed position;

a covering attached to said roof for extending over said pair of platforms;

a means for elevating and lowering said roof from said closed position to an open position; and a lock means mechanically connected to said means for elevating and lower said roof for preventing accidental movement of said roof;

wherein said means for elevating said roof comprises:
a plurality of guide brackets attached to said frame;
a plurality of support shafts slidably positioned within said plurality of guide brackets and attached to said roof; and
an elevating/lowering means mechanically connected to said plurality of support shafts for elevating and lowering said roof.

10. The collapsible portable camper system of claim 9, wherein said covering is attached to an underside of said pair of platforms by an attachment means.

11. The collapsible portable camper system of claim 9, further including:
a pair of wall frames; and
a each of said platforms having plurality of receiving tubes that removably receive one of said pair of wall frames.

12. The collapsible portable camper system of claim 9, including a plurality of rollers rotatably attached to said floor for allowing easy removal and insertion of said frame upon a conventional pickup.

13. The collapsible portable camper system of claim 9, including a plurality of tie downs for removably securing said frame within a pickup.

14. The collapsible portable camper system of claim 9, wherein said covering includes at least one opening covered with netting.

15. The collapsible portable camper system of claim 9, wherein said elevating/lowering means comprises:
a crank shaft rotatably attached to one of said side walls;
a pair of crank sprockets attached to opposing ends of said crank shaft;
a crank handle connectable to one of said pair of crank sprockets;
a pair of crank chains mechanically connected to said pair of crank sprockets;
a pair of first sprockets mechanically connected to said pair of crank chains;
a pair of first chains mechanically connected between said pair of first sprockets and a pair of second sprockets, wherein said pair of first chains are connected to a lower portion of at least two support shafts for elevating and lower said support shafts;
a pair of third sprockets mechanically connected to said pair of second sprockets by a corresponding pair of second chains; and
a pair of fourth sprockets mechanically connected to said pair of third sprockets by a corresponding pair of third chains, wherein said pair of third chains are connected to a lower portion of at least two support shafts for elevating and lower said support shafts.

16. The collapsible portable camper system of claim 11, including a plurality of storage brackets attached to said pair of platforms for removably receiving said pair of wall frames when not in use.

17. A collapsible portable camper system, comprising:
a frame;
a pair of platforms pivotally attached to said frame;
a roof removably enclosing said frame and said pair of platforms when in a closed position;
a covering attached to said roof for extending over said pair of platforms; and
a means for elevating and lowering said roof from said closed position to an open position, wherein said means for elevating and lowering said roof comprises a plurality of guide brackets attached to said frame, a plurality of support shafts slidably positioned within said plurality of guide brackets and attached to said roof, and an elevating/lowering means mechanically connected to said plurality of support shafts for elevating and lowering said roof.

18. The collapsible portable camper system of claim 17, wherein said covering is attached to an underside of said pair of platforms by an attachment means.

19. The collapsible portable camper system of claim 17, further including:
a pair of wall frames; and
each of said platforms having a plurality of receiving tubes that removably receive one of said pair of wall frames.

20. The collapsible portable camper system of claim 17, including a plurality of rollers rotatably attached to a floor of said frame for allowing easy removal and insertion at said frame upon a conventional pickup.

* * * * *